(12) United States Patent
Grosse Prues et al.

(10) Patent No.: US 11,168,707 B2
(45) Date of Patent: Nov. 9, 2021

(54) CONTROL DEVICE, AGRICULTURAL VEHICLE AND METHOD FOR OPERATING AN AGRICULTURAL VEHICLE

(71) Applicants: Amazonen-Werke H. Dreyer GmbH & Co. KG, Hasbergen (DE); HYDAC Systems & Services GmbH, Sulzbach (DE)

(72) Inventors: Frank Grosse Prues, Bersenbrück (DE); Georg Komma, Sankt Ingbert (DE); Patrick Krupp, Neuenkirchen (DE); Timo Kiefer, Saarlouis (DE); Peter Kohl, Blieskastel (DE)

(73) Assignees: Amazonen-Werke H. Dreyer SE & Co. KG, Hasbergen (DE); Hydac Systems & Services GmbH, Sulzbach (DE)

( * ) Notice: Subject to any disclaimer, the term of this patent is extended or adjusted under 35 U.S.C. 154(b) by 0 days.

(21) Appl. No.: 16/308,530

(22) PCT Filed: May 16, 2017

(86) PCT No.: PCT/EP2017/061681
§ 371 (c)(1),
(2) Date: Dec. 10, 2018

(87) PCT Pub. No.: WO2017/211547
PCT Pub. Date: Dec. 14, 2017

(65) Prior Publication Data
US 2019/0150358 A1    May 23, 2019

(30) Foreign Application Priority Data

Jun. 10, 2016    (DE) .................... 10 2016 110 693.3

(51) Int. Cl.
*F15B 11/00* (2006.01)

(52) U.S. Cl.
CPC ................. *F15B 11/003* (2013.01)

(58) Field of Classification Search
CPC ..................................................... F15B 11/003
See application file for complete search history.

(56) References Cited

U.S. PATENT DOCUMENTS

| 6,073,652 A * | 6/2000 | Wilke ........... F15B 11/003 137/596.16 |
| 6,871,574 B2 * | 3/2005 | Barber ........... F15B 13/015 91/420 |

(Continued)

FOREIGN PATENT DOCUMENTS

| DE | 20 2007 011631 U1 | 10/2007 |
| EP | 0518226 A1 | 12/1992 |

OTHER PUBLICATIONS

International Search Report for PCT/EP2017/061681 (dated Aug. 23, 2017).

*Primary Examiner* — F Daniel Lopez
(74) *Attorney, Agent, or Firm* — Mintz Levin Cohn Ferris Glovsky and Popeo, P.C.; Steven M. Jensen (57) ABSTRACT

A control device for an agricultural vehicle having a spray boom assembly for spreading material, such as fertilizer, plant protection products or seeds includes a control unit and at least two pressure control valves used for controlling an inclination of the spray boom assembly and connected to the control unit. Each pressure control valve has assigned thereto a check valve and a pressure sensor, the check valve being arranged between the pressure sensor and the pressure control valve. An agricultural vehicle and a method for operating the agricultural vehicle are arranged to spread material, such as fertilizer, plant protection products or seeds.

13 Claims, 5 Drawing Sheets

(56) References Cited

U.S. PATENT DOCUMENTS

| | | | |
|---|---|---|---|
| 8,827,180 B2* | 9/2014 | Honermann | A01M 7/0053 239/159 |
| 2007/0289438 A1 | 12/2007 | Thompson et al. | |
| 2014/0250877 A1* | 9/2014 | Bissbort | F15B 11/167 60/393 |

* cited by examiner

CONTROL DEVICE, AGRICULTURAL VEHICLE AND METHOD FOR OPERATING AN AGRICULTURAL VEHICLE

The present invention relates to a control device for an agricultural vehicle for controlling the inclination of a spray boom assembly according to the preamble of claim 1. The invention also relates to an agricultural vehicle according to claim 12 as well as to a method for operating an agricultural vehicle according to claim 13.

Such agricultural vehicles, which are also referred to as field sprayers, are used for spreading material, such as fertilizers, plant protection products or seeds. In order to spread the material over a large area on the field soil to be cultivated, the agricultural vehicles have a spray boom assembly that can cover a working width of up to 40 m. The spray boom assembly has spray nozzles attached thereto, which spray the material onto the soil to be cultivated. For efficiently spreading the material, the distance between the spray boom assembly and the ground should remain as constant as possible over the entire working width. Problems arise when the agricultural vehicle travels in ground ruts of different depths, on one side in a furrow, or on a slope of the field to be cultivated. With such ground unevenness, the ends of the spray boom assembly may come into contact with the ground and get damaged. In addition, the homogeneous distribution of the material to be spread is no longer given due to adverse drift effects resulting from the inclined position of the spray boom assembly.

In order to compensate for undesirable movements about the longitudinal axis of the vehicle, devices are known, which are provided with a pendulum suspension and with inclination sensors or distance sensors and which try to compensate for this inclination by means of actuators. In general, a horizontal position of the spray boom assembly in relation to the soil to be cultivated is here aimed at. Reference is exemplarily made to DE 20 2007 011 631 U1. There, a suspension device for a spray boom assembly is described, with two level valves being arranged in the area of the suspension of an auxiliary frame on the vehicle. Depending on the inclination position of the spray boom assembly in relation to the vehicle, the valves are opened or closed differently. In particular, the valves apply, proportionally to the deflection of the spray boom assembly, a pressure to an actuator, whereby the fluid is caused to change its flow path and enter into the coupled actuator. The actuator, which is expediently configured as a pneumatic and/or hydraulic actuator, is thus activated.

The activation of the actuator causes the spray boom assembly to be pivoted. The actuator can thus change the inclination of the spray boom assembly. After the inclination has been compensated for, the valve will close again.

There are, however, situations, such as road transport or when the spray boom assembly is folded in or out, where the spray boom assembly should be rigidly connected to the agricultural vehicle via the actuator. To this end, check valves are arranged in the feed lines to the actuator. As soon as these check valves are closed, no fluid can escape from the actuator and the spray boom assembly is rigidly connected to the agricultural vehicle. The subsequent opening of the check valves, especially in a condition where the spray boom assembly has been folded asymmetrically, may lead to uncontrolled and thus detrimental movements of the spray boom assembly. The check valves are here ideally configured as seat-tight elements. This means that no oil can pass in the closed condition.

Therefore, it is the object of the present invention to provide a control device for an agricultural vehicle, which reduces the risk of uncontrolled movements of the spray boom assembly, in particular during opening of the check valves. It is also the object of the present invention to provide an agricultural vehicle as well as a method for operating an agricultural vehicle.

According to the present invention, this object is achieved by a control device having the features of claim 1. As regards the agricultural vehicle, the object is achieved by the subject matter of claim 12. Furthermore, as far as the method is concerned, the object is achieved by the subject matter of claim 13.

The invention is based on the idea of providing a control device for an agricultural vehicle having a spray boom assembly for spreading material, such as fertilizers, plant protection products or seeds, the control device comprising a control unit and two pressure control valves used for controlling the inclination of the spray boom assembly and connected to the control unit. Each pressure control valve has assigned thereto a check valve and a pressure sensor, the check valve being arranged between the pressure sensor and the pressure control valve.

The invention is advantageous insofar as the pressure control valves allow a precise control of the pressure so as to counteract an occurring inclination of the spray boom assembly. In addition, the efficiency of the inclination control of the spray boom assembly is improved by using pressure sensors. By means of the check valves, the spray boom assembly can be kept at a rigid position in an advantageous manner. This is particularly advantageous when the agricultural vehicle is travelling on a road or when the spray boom assembly is folded in or out. Since the check valves can be closed, no fluid can escape from the hydraulic cylinder and the spray boom assembly can fixedly be held in place on the agricultural vehicle, if necessary.

The fact that, according to the present invention, the check valve is arranged between the respective pressure sensor and the pressure control valve is advantageous insofar as the pressure in the inclination cylinder can be detected in the closed as well as in the open condition of the check valve. Hence, the prevailing pressure of the pressure control valves can be measured precisely in the event that check valves are used and also in the event that no check valves are provided.

Quite generally, the invention has the advantage that the inclination adjustment of the spray boom assembly is influenced more effectively. A largely homogeneous output of fertilizers, plant protection products or seeds can thus be guaranteed and damage to the spray boom assembly can be avoided efficiently. This leads to an increase in the efficiency of the agricultural vehicle.

Preferred embodiments of the invention are disclosed in the subclaims.

According to a preferred embodiment, the control unit comprises an actuator defined by at least one pneumatically and/or hydraulically operating cylinder, in particular a double-acting hydraulic cylinder. Such cylinders constitute cost-efficient and simple means of returning the spray boom assembly to its horizontal initial position, if an inclination should occur. The double-acting hydraulic cylinder may e.g. be provided with a piston, which is adapted to have pressure applied thereto on both sides, so that the movement of the spray boom assembly can be influenced in an opposite direction. The actuator is here preferably attached to a frame, the spray boom assembly being fixed to and held on said frame. The actuator may here also be connected directly to the spray boom assembly in an expedient manner. This has the advantage that the actuator can directly apply a mechanical force effect to the spray boom assembly. This guarantees a reliable and precise inclination adjustment. Quite generally, various types of actuators are imaginable, such as pneumatic cylinders, electric motors or hydraulic motors.

According to a specially preferred embodiment, the control unit is configured such that, during opening of the check valves, the pressure control valves are adapted to the pressure measured by the respective pressure sensor. For this purpose, the pressure sensor is expediently arranged between the check valve and the actuator. The pressure sensors and the pressure control valves may be coupled to the control unit. In this way, a measured pressure value of the pressure sensors can be forwarded to the pressure control valves via an electronic signal of the control unit, and the pressure control valves can be adjusted to the measured pressure value as a target value.

Since uncontrolled movements may very easily occur during opening of the check valves, the control of the inclination adjustment is, in an advantageous manner, precisely adapted to the target value, which is measured by the pressure sensor, during the check-valve opening process. The process of opening the check valves comprises here the moments in time shortly before opening, during opening or shortly after opening. In this way, uncontrolled movements of the spray boom assembly can be prevented quickly and efficiently.

Preferably, the pressure control valves are settable and/or adjustable independently of one another at identical and/or different positions. This means that the two pressure control valves can each be controlled independently via an electronic signal from the control unit and can be adjusted to different target values. Hence, the control device can be used efficiently for symmetrical as well as for asymmetrical spray boom assemblies. Especially in the case of asymmetrical spray boom assemblies, which exhibit different working widths on the right and on the left side of a central suspension of the spray boom assembly, different pressures prevail due to the different mass distributions. Since the two pressure control valves are settable and/or adjustable independently of one another, also pressure differences at the spray boom assembly can precisely be detected and compensated. In this way, also an asymmetrical spray boom assembly can reliably be held at a horizontal position in relation to the ground.

According to an advantageous embodiment, the pressure control valves are defined by proportional valves, in particular by 3-way valves. Such valves may e.g. be configured as directly controlled piston slide valves with output-side pressure safeguarding. To this end, the valves may comprise a valve body with a control piston, a return spring and a solenoid coil with an armature for electrical actuation. When an electrical signal is applied via the control unit, the armature can press onto the control piston with a force corresponding to the signal. As a result, oil can flow through the valve and pressure can be built up or reduced, whereby the actuator can be activated.

This continues until the applied pressure corresponds to the pressure value specified by the electrical signal. The function of proportional valves is, quite generally, based on a control of a pressure difference occurring. If the pressure drops below a preset pressure level, the valve will automatically supply oil from the hydraulic reservoir until the target value has been reached again. Otherwise, oil will be discharged if the pressure level is too high. The use of proportional valves provides efficient control and stability properties as well as a low hysteresis of the valves, which may occur due to friction and magnetization. In addition, proportional valves allow a space-saving installation as well as easy mounting and an easy exchangeability. Making use of such valves, the hydraulic pressures in the cylinder chambers of the actuator can be adjusted independently of one another and the inclination of the spray boom assembly can thus be actively influenced.

According to another advantageous embodiment, the pressure control valves are adaptable to a target value independently of one another, based on a measured signal of the respective pressure sensor or on an actual value determined in some other way. The independent adaptation of the pressure control valves to a target value is particularly advantageous for asymmetrical spray boom assemblies. Quite generally, it is imaginable that, in addition to the pressure sensors, also further sensors, such as inclination sensors or distance sensors, are used for determining the inclination of the spray boom assembly.

According to a preferred embodiment, the pressure control valves are adapted to be set to a target value in an electronically controlled manner on the basis of a known characteristic curve. The characteristic curves describe, for example, the relationship between a pressure occurring and the associated, necessary electrical current at a control coil of the valve. Exemplarily, a target value of the pressure control valves to be set can be ascertained via the pressure sensors, whereby a control current is applied to the valves on the basis of the characteristic curve so as to set the pressure in question. This has the advantage that the pressure acting on the spray boom assembly can precisely be adjusted to a target value via the characteristic curve of the pressure control valves.

Preferably, the pressure control valves are, for the purpose of fine adjustment, adaptable by means of a closed loop to a target value corresponding to the measured pressure in the closed condition of the check valves. Since the characteristic curve of the pressure control valves has certain manufacturing tolerances and a hysteresis, the electronic signal is, based on the characteristic curve, additionally corrected by means of a closed loop for the purpose of fine adjustment of the pressure to be set in the pressure control valves. The adaptation of the pressure control valves is thus improved still further in an advantageous manner.

According to another preferred embodiment, the pressure value measured by the pressure sensors is smoothed and/or averaged by means of a filter function for setting the target value. This has the advantage that so-called pressure peaks, which represent incorrect measurements of the pressure sensors, can efficiently be prevented and corrected.

According to a preferred embodiment, the two pressure control valves exhibit an identical pressure, in particular a pressure of 70-90 bar, when the spray boom assembly is at a symmetrical, horizontally oriented position. A symmetrical spray boom assembly has, quite generally, the same working width on both sides of the central suspension. Hence, the actuator has applied thereto the same pressure on both sides due to the right-hand-side and the left-hand-side mass of the spray boom assembly. The pressure difference is consequently almost 0 bar. It is therefore advisable to set the pressure control valves to an identical pressure level and to maintain this pressure level. If an inclination of the spray boom assembly occurs, the occurring pressure difference at the pressure control valves can, by means of the control device, be readapted to the original pressure that was identical on both sides. The pressure can therefore be increased or decreased in equal proportions in the respective cylinder chambers so as to return the spray boom assembly to the horizontal initial position.

According to a further embodiment, the two pressure control valves exhibit a pressure difference, when the spray boom assembly is at an asymmetrical or inclined position. In order to prevent the spray boom assembly from moving even further towards the inclined side, this pressure difference must be maintained via the pressure control valves. To this end, it will be expedient to control the valves via the control unit by an electrical signal such that the pressure difference will be maintained and the spray boom assembly will not rotate.

In addition, an agricultural vehicle for spreading material, such as fertilizers, plant protection products or seeds, comprising a spray boom assembly and a control device according to one of the preceding embodiments is claimed within the scope of the present invention. By means of the control device according to the present invention, the inclination of the spray boom assembly relative to the ground can be influenced efficiently and the risk of uncontrolled movements of the spray boom assembly, in particular during opening of the check valves, can be reduced. This guarantees homogeneous spreading of the material.

In addition, a method for operating an agricultural vehicle having a spray boom assembly for spreading material, such as fertilizers, plant protection products or seeds, is claimed within the scope of the present invention.

The agricultural vehicle comprises a control device with a control unit and two pressure control valves used for controlling the inclination of the spray boom assembly and connected to the control unit. Each pressure control valve has assigned thereto a check valve and a pressure sensor, the check valve being arranged between the pressure sensor and the pressure control valve and the control unit being configured such that, during opening of the check valves, the pressure control valves will be adapted to a target value. The target value is here expediently the pressure value between the respective pressure control valve and the actuator, said pressure value being measured by the respective pressure sensor. This means that it will be expedient to adapt and set, prior to opening the check valves, the pressure control valves to the target value measured by the respective pressure sensors. In this way, uncontrolled movements after the opening of the check valves can efficiently be prevented. The target value may expediently consist of a specific pressure difference of the spray boom assembly. This pressure difference depends on the symmetrical or asymmetrical orientation of the spray boom assembly.

Preferably, the pressure control valves are set to a target value in an electronically controlled manner on the basis of a known characteristic curve. This means that a necessary target value for each of the two pressure control valves is determined via the pressure sensors. Subsequently, the control current corresponding to the target value is applied to the pressure control valves via the known characteristic curve of the pressure control valves. This has the effect that the valve will switch such that the desired pressure will be applied to the respective side of the actuator. The pressure acting on the spray boom assembly can thus be adapted precisely to a target value by means of the pressure control valves, and the inclination of the spray boom assembly can be influenced efficiently in this way.

According to a further preferred embodiment, an adaptation to a target value is carried out by means of a closed loop for accomplishing a fine adjustment of the pressure control valves. In view of manufacturing tolerances and a hysteresis that may perhaps occur, the electronic signal is, based on the characteristic curve, additionally corrected by means of a closed loop, so as to accomplish a fine adjustment of the pressure in the pressure control valves to be set. To this end, the actual value in the cylinder chambers of the actuator is detected via the pressure sensors and adapted via a target value/actual value comparison by means of the closed loop. Exemplarily, a P controller, based on a proportionality, or a PI controller, based on a proportional and integral mode of operation, may be used. It follows that, in the open condition of the check valve, the pressure sensors can be used for accomplishing a fine adjustment of the pressure control valves.

According to a further preferred embodiment, the pressure value measured by the pressure sensors is smoothed and/or averaged by means of a filter function for setting the target value. This allows to prevent pressure peaks, i.e. possible incorrect measurements of the pressure sensors, in a particularly efficient manner. This means that the measured value of the pressure sensors is not directly used as a target value, but is transferred to the control unit as a corrected signal. The smoothing by means of filtering and/or the averaging is carried out continuously in the case of each measurement.

In the following, the present invention will be explained in more detail making reference to the attached schematic drawings, in which.

Figure 1:
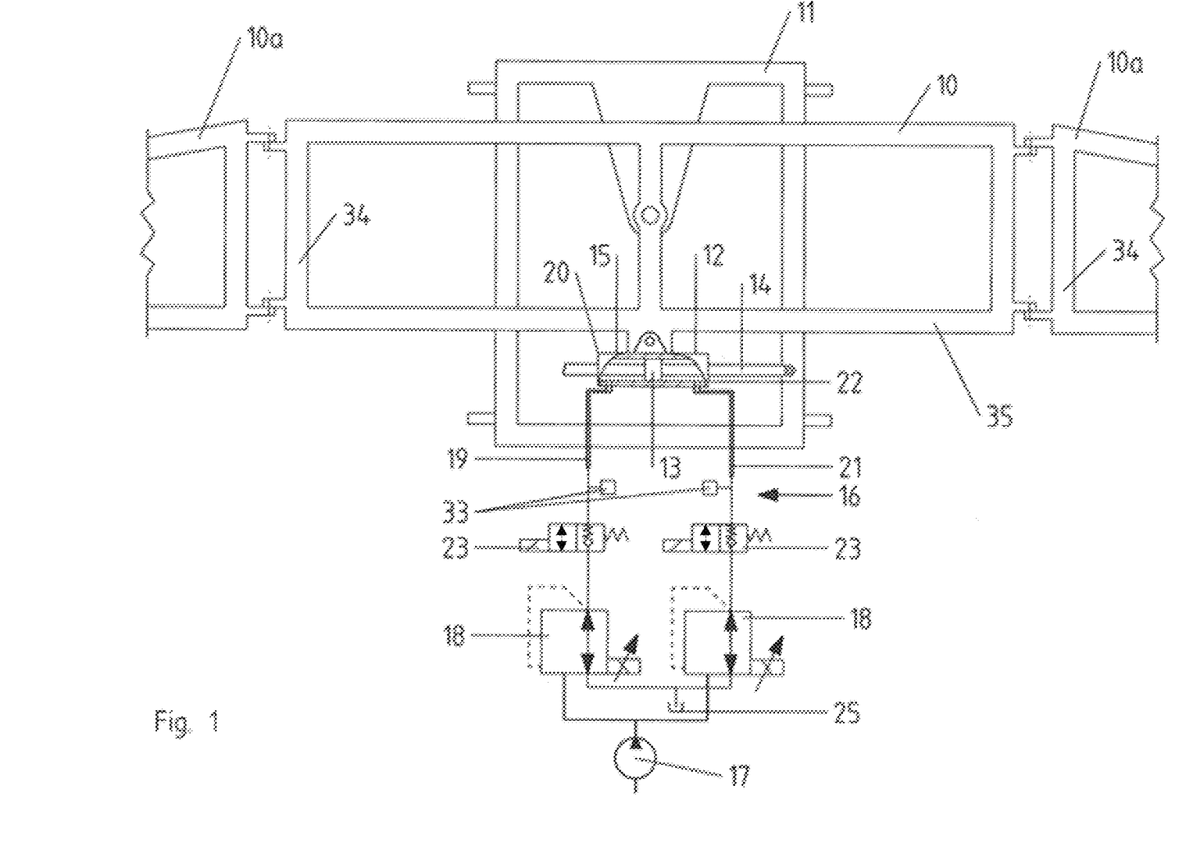
FIG. 1 shows a detail of a spray boom assembly on a frame with a control device according to the present invention.

FIG. 1 shows a detail of a spray boom assembly 10 on a frame 11 with a control device according to the present invention. The spray boom assembly 10 serves to spread material, such as fertilizers, plant protection products or seeds. The control device comprises a control unit, which is not shown, and two pressure control valves 18 used for controlling the inclination of the spray boom assembly 10 and connected to the control unit. Each pressure control valve 18 has assigned thereto a check valve 23 and a pressure sensor 33, the check valve 23 being arranged between the pressure sensor 33 and the pressure control valve 18.

The frame 11 shown in FIG. 1 is, exemplarily, connected to the agricultural vehicle such that it is secured against rotation relative thereto and it may expediently be vertically adjustable. The frame 11 is defined by a plurality of struts in the form of a rectangle, by way of example. The frame 11 defines the suspension for the spray boom assembly 10.

The detail shows the central part of the spray boom assembly 10 as well as two adjoining segments 10*a* of the spray boom assembly 10. The individual segments 10a may be defined by horizontal struts 35 and vertical struts 34.

For adjusting the inclination of the spray boom assembly 10, an actuator 12 and a control device for operating the actuator 12 are provided. The actuator 12 is mechanically connected directly to the frame 11 on the one hand and directly to the spray boom assembly 10 on the other. The actuator 12 is configured as a double-acting hydraulic cylinder comprising a piston 13 in a housing 15, the piston 13 being adapted to have pressure applied thereto on both sides. Piston rods 14 are arranged on both sides of the piston 13. One of the two piston rods 14 is mechanically connected to the frame 11, the other piston rod 14 has a free end. The transmission of force from the frame 11 to the spray boom assembly 10 is therefore effected in a direct manner by the actuator 12. In general, the actuator may also consist of a cylinder having a different area ratio on the two sides thereof. For example, a cylinder is imaginable which has a ring surface and a piston surface with different areas.

For force transmission and thus for adjusting the inclination, the actuator 12 is connected to a hydraulic circuit 16. The hydraulic circuit 16 is defined by an open circuit comprising a hydraulic reservoir 25 and a pump 17. Two pressure control valves 18 are arranged between the pump 17 and the hydraulic reservoir 25 on the one hand and actuating cylinder 12 on the other. In other words, the pressure control valves 18 connect the pump 17 and the hydraulic reservoir 25 to the two pressure sides 20, 22 of the actuator 12. To this end, the hydraulic circuit 16 comprises first and second feed lines 19, 21 between the actuator 12 and the respective pressure control valve 18.

The control device additionally comprises two pressure sensors 33. The pressure sensors 33 are arranged between the actuator 12 and the respective pressure control valve 18. Making use of the pressure sensors 33, the pressure occurring in the first and second feed lines 19, 21 can be measured. These measurement signals are processed for controlling the pressure control valves 18 via the control unit, which is not shown. Depending on the respective pressure measured, the pressure control valves 18 are then adapted in an expedient manner by means of the characteristic curves of the respective valves.

Figure 2A:
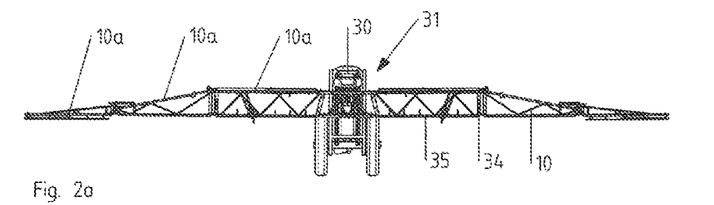
FIG. 2*a-d* each show a rear view of an agricultural vehicle with a control device and a symmetrical spray boom assembly according to an embodiment of the present invention as well as a detail of the control device according to FIG. 1.
Figure 2B:
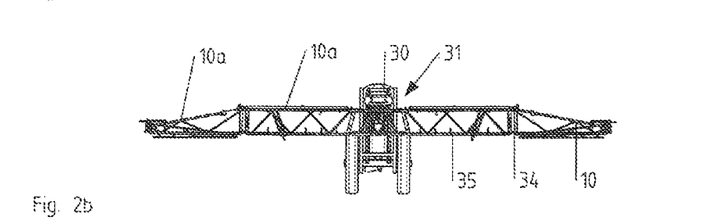
Figure 2C:
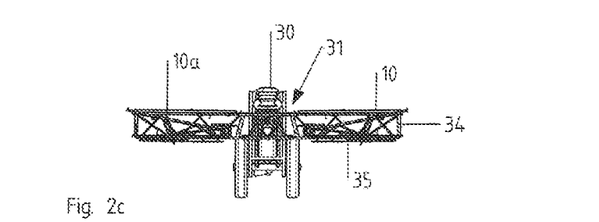

FIG. 2a-c each show schematically a rear view of a machine 31, which is configured as field sprayer. The field sprayer may be towed by a towing vehicle, it may be self-propelled or it may be attached to an agricultural vehicle. A feature which is common to FIG. 2a-c is that the machine 31 comprises a spray boom assembly 10 and a storage hopper 30, in which material to be spread, such as fertilizers, plant protection products or seeds, is accommodated. For this purpose, the spray boom assembly 10 comprises spray nozzles arranged on and along the lower surface of the spray boom assembly 10. The spray nozzles may be connected through a hose system to a pump and the storage hopper 30. The spray boom assembly 10 is advantageously configured to be foldable for road transport.

FIGS. 2 a-c differ with respect to the width of the spray boom assembly 10. In FIG. 2a, the spray boom assembly is fully extended. It comprises, on each side of the boom assembly, three segments 10a and a central segment in the middle. FIG. 2b shows the spray boom assembly 10 with the outermost segments 10a folded in on both sides. In FIG. 2c, however, the respective outer two segments 10a are folded in. The spray boom assembly 10 and the segments 10a, respectively, are defined by horizontal struts 35 and vertical struts 34.

The spray boom assembly 10 is centrally suspended from a frame of the machine 31. An adjustment of the total inclination of the spray boom assembly 10, i.e. an adjustment of the extended, straight spray boom assembly 10, can be accomplished by means of an control device according to FIG. 1.

Figure 2D:
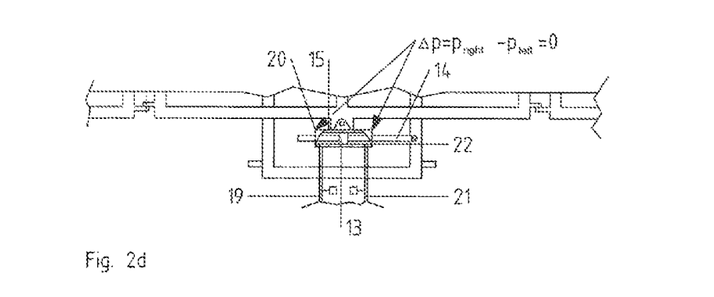

FIG. 2d shows in this context a detail of the control device according to FIG. 1 with the set pressure conditions for the symmetrically supported spray boom assembly 10. The pressure difference $\Delta p$ between the left-hand first pressure side 20 and the right-hand second pressure side 22 of the actuator 13 is equal to zero. Both pressure sides are therefore set to the same pressure. For a symmetrically supported spray boom assembly 10, this pressure may e.g. be in the range of 70-90 bar.

Figure 3A:
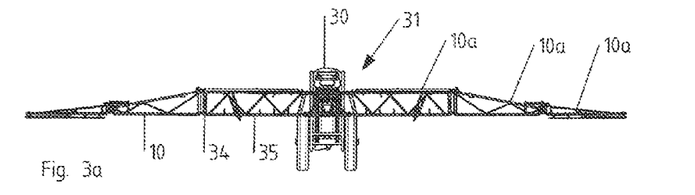
FIG. 3*a-d* each show a rear view of an agricultural vehicle with a control device and an asymmetrical spray boom assembly according to a further embodiment of the present invention as well as a detail of the control device according to FIG. 1.
Figure 3B:
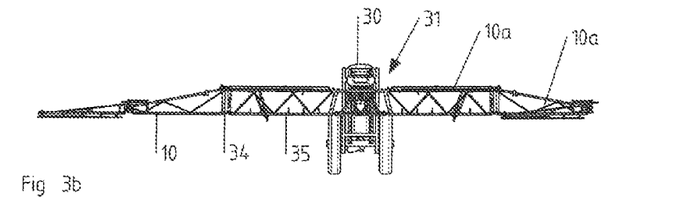
Figure 3C:
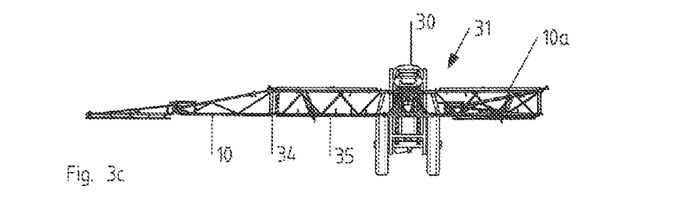

FIG. 3a-c each show schematically a rear view of a machine 31, which is configured as a field sprayer. Similar to FIG. 2, the field sprayer is configured such that it comprises a spray boom assembly 10 and a storage hopper 30, in which material to be spread is accommodated. FIG. 3a-c differ with respect to the working width of the spray boom assembly. In FIG. 3a, the spray boom assembly 10 is exemplarily defined by three segments 10a on both sides of the storage hopper 30. In FIG. 3b there are only three segments on the right hand side, since the outer segment 10a is in the folded-in condition. In FIG. 3c only one segment 10a is extended on the right hand side, whereas the outer two segments are folded in. The spray boom assembly 10 is therefore exemplarily asymmetrically supported, since in FIGS. 3b and 3c it does not exhibit on the two sides of the storage hopper 30 the same number of segments 10a in the extended condition. In the case of an asymmetric spray boom assembly 10 the two sides differ, quite generally, with respect to the number of extended segments 10a, or, generally speaking, with respect to the working width.

Hence, a pressure difference $\Delta p$ will occur preferably in FIGS. 3b and 3c. The pressure difference $\Delta p$ results from the fact that the spray boom assembly 10 has a different mass distribution on the right and on the left side. This different mass distribution may exemplarily also occur with the symmetrically supported spray boom assembly 10 in FIG. 3a, if an inclination oriented to the left occurs.

An adjustment of the total inclination of the distributor linkage 10, i.e. an adjustment of the extended, straight spray boom assembly 10, can be accomplished by means of a control device according to FIG. 1.

Figure 3D:
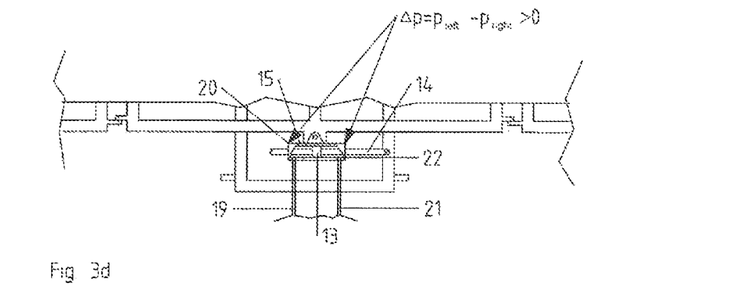

FIG. 3d shows in this context a detail of the control device according to FIG. 1 with the set pressure conditions for the asymmetrically supported spray boom assembly 10 or the spray boom assembly 10 inclined to the left. The pressure difference $\Delta p$ between the left-hand first pressure side 20 and the right-hand second pressure side 22 of the actuator 12 is greater than zero. Accordingly, the pressure on the left side is greater than the pressure on the right side. If, for example, after the spray boom assembly 10 has been folded in or out only partially, i.e. in a situation of the type shown e.g. in FIG. 3c, abrupt dropping of the spray boom assembly 10 after the opening of the check valves 23 is to be avoided in the closed condition of the check valves, it will be expedient to control the valves 18 via the control unit by an electrical signal such that the pressure difference will be maintained after the opening of the check valves 23 and the spray boom assembly 10 will not rotate during opening of the check valves 23. In this way, it is achieved that, during opening of the check valves 23, the pressure prevailing between the check valves 23 and the respective side of the actuator 12 will also prevail, at least approximately, upstream of the respective check valve 23.

Figure 4A:
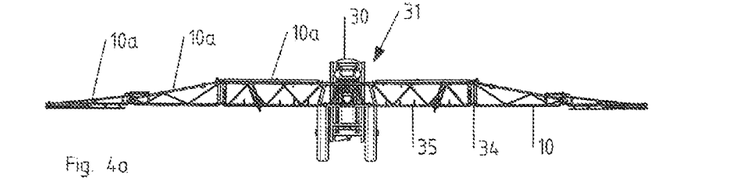
FIG. 4*a-d* each show a rear view of an agricultural vehicle with a control device and an asymmetrical spray boom assembly according to a third embodiment of the present invention as well as a detail of the control device according to FIG. 1.
Figure 4B:
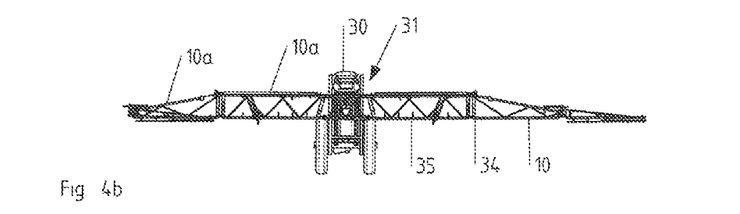
Figure 4C:
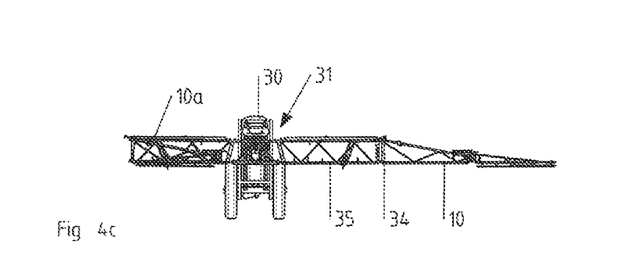

FIG. 4a-c each show schematically a rear view of a machine 31, which is configured as a field sprayer. The field sprayer is configured in a way similar to FIG. 2 and comprises a spray boom assembly 10 and a storage hopper 30 with material to be spread. FIG. 4a-c differ with respect to the working width of the spray boom assembly. In FIG. 4a, the spray boom assembly 10 is exemplarily defined by three segments 10a on both sides of the storage hopper 30 and a central segment 10a. In FIG. 4b there are only three segments 10a on the left, the outer segment 10a is folded in. In FIG. 4c only one segment 10a is extended on the left, whereas the two outer segments 10a are folded in. The spray boom assembly 10 is therefore asymmetrically supported, like in FIGS. 3b and 3c, since in FIGS. 4b and 4c it does not exhibit on the two sides of the storage hopper 30 the same number of segments 10a in the extended condition. Hence, a pressure difference Δp will also occur in FIGS. 4b and 4c. The pressure difference Δp may exemplarily also occur in the case of the symmetrically supported spray boom assembly 10 in FIG. 4a, if an inclination oriented to the right occurs.

An adjustment of the total inclination of the spray boom assembly 10, i.e. an adjustment of the extended, straight spray boom assembly 10, can be accomplished by means of a control device according to FIG. 1.

Figure 4D:
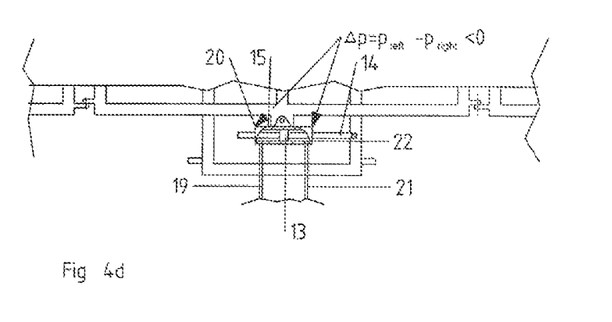

FIG. 4d shows in this context a detail of the control device according to FIG. 1 with the set pressure conditions for the spray boom assembly 10 that is asymmetrically supported or inclined to the right. The pressure difference Δp between the left-hand first pressure side 20 and the right-hand second pressure side 22 of the actuator 13 is negative. Hence, the pressure on the left side is smaller than the pressure on the right side. In order to prevent the spray boom assembly 10 from moving downwards on the right side during opening of the check valves 23, this pressure difference must advantageously be maintained via the pressure control valves 18 during opening of the check valves 23.

Quite generally, the control device according to the present invention can efficiently be used for inclination control and for avoiding uncontrolled movements in the case of symmetrical or asymmetrical spray boom assemblies having an arbitrary working width.

In particular, the control device according to the present invention is configured such that, at the time of opening the check valves, the pressure control valves 18 are adapted at least approximately to the pressure of the respective adjustment side, said pressure being measured by the pressure sensors 33.

In this way, the spray boom assembly 10 can be prevented from carrying out, e.g. when the spray boom assembly 10 is extended asymmetrically as shown in FIG. 4 a-c, in the closed condition of the check valves 23 an uncontrolled movement in a clockwise direction after the opening of the check valves 23, or, in the case of a situation according to FIG. 3 a-c, a movement in an anti-clockwise direction.

To this end, the pressure control valves 18 are, prior to opening the check valves 23, controlled such that the pressures of the left and right pressure side of the actuator 12 measured by the pressure sensors 33 are, at least approximately, applied to the check valves 23, so that, after the opening of the check valves 23, no uncontrolled change in pressure and no uncontrolled movement of the spray boom assembly 10 resulting from such a change in pressure will have to be reckoned with. By means of the characteristic curves stored in the control unit for the respective pressure control valve, which characteristic curves may also be identical and in particular generic characteristic curves, the signals for controlling the pressure control valve 18 are thus generated by the control unit according to the value measured by the respective pressure sensor 33.

Figure 5:
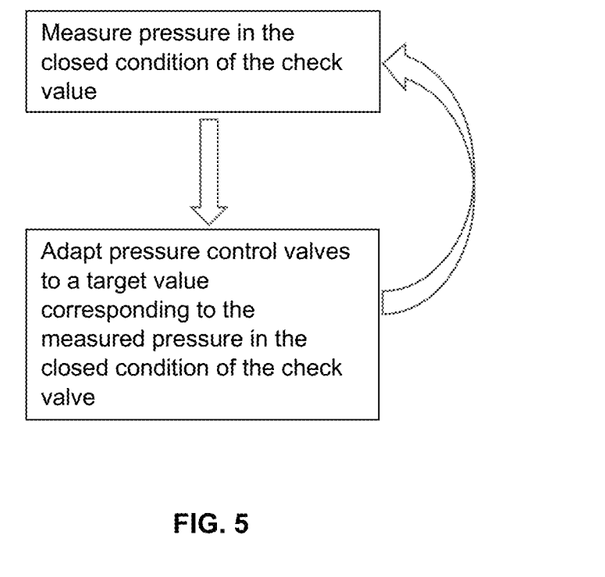
FIG. 5 is a flow chart schematically depicting a closed loop control circuit for controlling pressure of a pressure control valve based on measured pressure of a check valve.

Due to hysteresis or manufacturing tolerances, a pressure value deviating from the pressure value to be expected on the basis of the characteristic curve may here be adjusted. To this end, a control circuit (e.g., a closed loop, as shown in FIG. 5) may additionally be provided for the respective pressure side 20, 22, which, after opening of the respective check valve 23, compares the measured pressure value by means of the pressure sensor 33 with the desired target value that was ascertained prior to opening the check valve 23, and which, if necessary, adapts the position of the pressure control valve 18. This controller may be configured e.g. as a PI controller. The target value may also be variable in time, if, for example, a defined inclination of the spray boom assembly 10 is to be adjusted after the opening of the check valve 23.

LIST OF REFERENCE NUMERALS 10 spray boom assembly
10a segment
11 frame
12 actuator
13 piston
14 piston rod
15 housing
16 hydraulic circuit
17 pump
18 pressure control valve
19 first feed line
20 first pressure side
21 second feed line
22 second pressure side
23 check valve
25 hydraulic reservoir
30 storage hopper
31 machine
33 pressure sensor
34 vertical strut
35 horizontal strut

The invention claimed is:
1. A control device for an agricultural vehicle having a spray boom assembly for spreading material, the material being fertilizer, plant protection products or seeds, the control device comprising:
   a control unit and two pressure control valves used for controlling an inclination of the spray boom assembly and connected to the control unit; and
   two check valves and two pressure sensors, the check valves and the pressure sensors corresponding to the pressure control valves, respectively,
   wherein each of the pressure control valves is connected to a respective one of the pressure sensors, with a respective one of the check valves being arranged between the respective one of the pressure sensors and the respective pressure control valve,
   wherein during opening of the check valves, the control unit controls pressure of each of the pressure control valves such that the pressure set by each of the pressure control valves is approximately equal to a pressure measured by the respective one of the pressure sensors, and wherein the pressure control valves are three-way valves.

2. The control device according to claim 1, wherein the control unit comprises an actuator defined by at least one pneumatically or hydraulically operating cylinder.

3. The control device according to claim 2, wherein the actuator is a double-acting hydraulic cylinder.

4. The control device according to claim 2, wherein the check valves are configured to be closed to prevent fluid from escaping the actuator.

5. The control device according to claim 1, wherein the pressure control valves are defined by proportional valves.

6. The control device according to claim 1, wherein the pressure value measured by the pressure sensors is smoothed or averaged by means of a filter function for setting a target value.

7. The control device according to claim 1, wherein, at a symmetrical, horizontally oriented position of the spray boom assembly, the two pressure control valves exhibit an identical pressure.

8. The control device according to claim 7, wherein the identical pressure is 70-90 bar.

9. The control device according to claim 1, wherein, at an asymmetrical or inclined position of the spray boom assembly, the two pressure control valves exhibit a pressure difference.

10. An agricultural vehicle for spreading the material being fertilizer, plant protection products or seeds, comprising:
    the spray boom assembly and the control device according to claim 1; and
    a storage hopper containing the fertilizer, plant protection products or seeds.

11. A method for operating an agricultural vehicle having a spray boom assembly for spreading material, the material being fertilizer, plant protection products or seeds, the method comprising:
    controlling an inclination of the spray boom assembly, using a control device with a control unit and two pressure control valves connected to the control unit;
    providing two check valves and two pressure sensors, the check valves and the pressure sensors corresponding to the pressure control valves, respectively;
    connecting a respective one of the pressure sensors to each of the pressure control valves, with a respective one of the check valves being arranged between the respective one of the pressure sensors and the respective pressure control valve; and
    during opening of the check valves, controlling pressure of each of the pressure control valves such that the pressure set by each of the pressure control valves is approximately equal to a pressure measured by the respective one of the pressure sensors,
    wherein the pressure control valves are three-way valves.

12. The method according to claim 11, wherein the pressure value measured by the pressure sensors is smoothed or averaged by means of a filter function for setting a target value.

13. The method according to claim 11, wherein the control unit comprises an actuator defined by at least one pneumatically or hydraulically operating cylinder, and the check valves are configured to be closed to prevent fluid from escaping the actuator.

* * * * *